(12) United States Patent
Tseng et al.

(10) Patent No.: US 7,896,979 B2
(45) Date of Patent: Mar. 1, 2011

(54) ACTIVATING FLUX FOR WELDING STAINLESS STEELS

(75) Inventors: Ping-Chung Tseng, Pingtung (TW); Kuang-Hung Tseng, Kaohsiung (TW)

(73) Assignee: National Pingtung University of Science & Technology, Pingtung County (TW)

( * ) Notice: Subject to any disclaimer, the term of this patent is extended or adjusted under 35 U.S.C. 154(b) by 728 days.

(21) Appl. No.: 11/772,521

(22) Filed: Jul. 2, 2007

(65) Prior Publication Data
US 2008/0029185 A1   Feb. 7, 2008

(30) Foreign Application Priority Data
Aug. 7, 2006   (TW) .............................. 95128912 A (51) Int. Cl.
*B23K 35/34* (2006.01)

(52) U.S. Cl. .......................................... 148/23; 75/302
(58) Field of Classification Search ............ 219/146.23; 148/24, 23; 75/302
See application file for complete search history.

(56) References Cited

U.S. PATENT DOCUMENTS

| 4,086,463 A | * | 4/1978 | Omori et al. | ............ 219/145.22 |
| 6,339,209 B1 | * | 1/2002 | Kotecki | ................. 219/146.23 |
| 2005/0199317 A1 | | 9/2005 | Chou et al. | |

FOREIGN PATENT DOCUMENTS

JP   2000326092 A   * 11/2000

* cited by examiner

*Primary Examiner*—Emily M. Le
*Assistant Examiner*—Weiping Zhu
(74) *Attorney, Agent, or Firm*—Alan Kamrath; Kamrath & Associates PA (57) ABSTRACT

An activating flux for welding stainless steel includes: from 25 to 40 weight percent of titanium dioxide ($TiO_2$); from 25 to 30 weight percent of chromium oxide ($Cr_2O_3$); from 10 to 30 weight percent of silicon dioxide ($SiO_2$); from 10 to 15 weight percent of molybdenum disulphide ($MoS_2$); and from 5 to 15 weight percent of molybdenum trioxide ($MoO_3$), which are active additive materials. A welding rod or wire includes a welding material and an activating flux. The activating flux layer is provided on or in the welding rod or wire and is formed as an outer layer or a core portion of the welding rod or wire.

10 Claims, 5 Drawing Sheets

ACTIVATING FLUX FOR WELDING STAINLESS STEELS

BACKGROUND OF THE INVENTION

1. Field of the Invention

The present invention relates to the activating flux for welding stainless steels. Particularly, the present invention relates to the activating flux including an active additive material selected from titanium dioxide ($TiO_2$), chromium oxide ($Cr_2O_3$), silicon dioxide ($SiO_2$), molybdenum disulphide ($MoS_2$) and molybdenum trioxide ($MoO_3$). More particularly, the present invention relates to the additive material of the activating flux for increasing a degree of the weld penetration capability and a degree of weldability of stainless steel material in arc welding techniques.

2. Description of the Related Art

Throughout the history of stainless steel, various techniques of conventional arc welding have been used. Generally, conventional arc welding includes Tungsten Inert Gas (TIG) Welding, Metal Inert Gas (MIG) Welding, Carbon Arc Welding (CAW), Submerged Arc Welding (SAW), Flux Cored Arc Welding (FCAW), etc.

By way of example, TIG welding, which uses an arc between a nonconsumable tungsten electrode and the workpieces to be welded under a shielding gas, is an extremely important arc welding process. In the arc welding process, a welding torch supplies an inert gas as well as a protective gas on a predetermined position of the stainless steel for the welding operation. The inert gas can prevent oxidation on the electrode, weld pool and adjacent heat-affected zone (HAZ) so as to cool and solidify a weld bead. However, when processing full penetration on the stainless steel welds, a number of limitations and drawbacks exist for TIG welding. The primary problem with such TIG welding is that the welds are susceptible to problems of insufficient penetration depth, varied penetration depth and broad, shallow weld pool. This results from a slight change of alloy elements of the workpiece. Accordingly, there is a need for increasing penetration in TIG welds so as to increase a degree of full penetration welds.

Figure 1A:
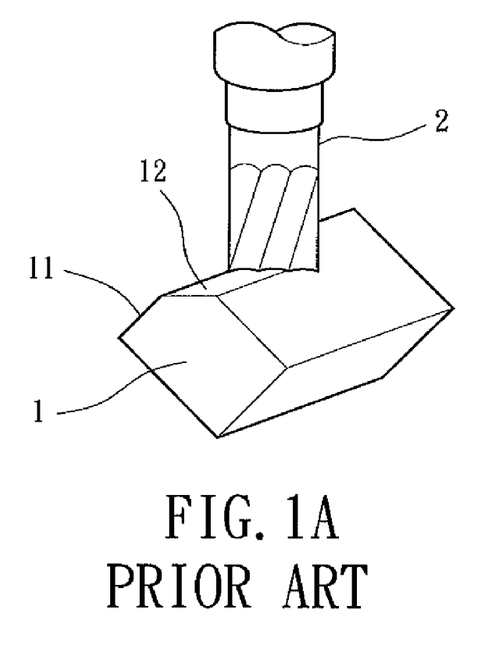
FIG. 1A is a perspective view illustrating a milling cutter cutting an inclined surface on a workpiece for TIG welding in accordance with the prior art.
Figure 1B:
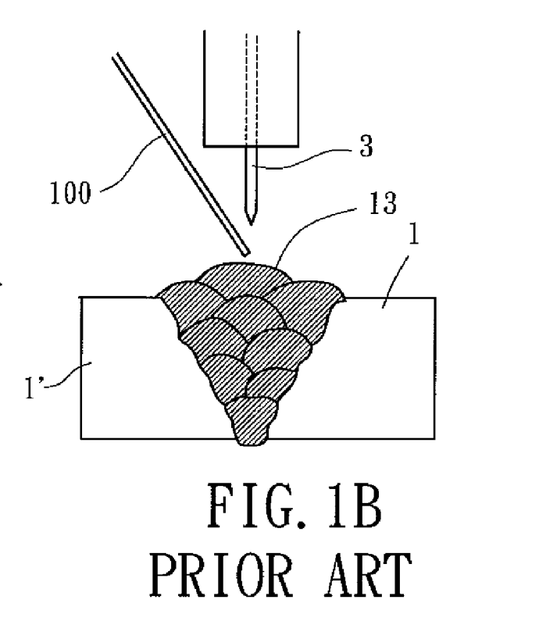
FIG. 1B is a side elevational view illustrating a TIG welding operation process on a butt joint of two workpieces in accordance with the prior art.
Figure 1C:
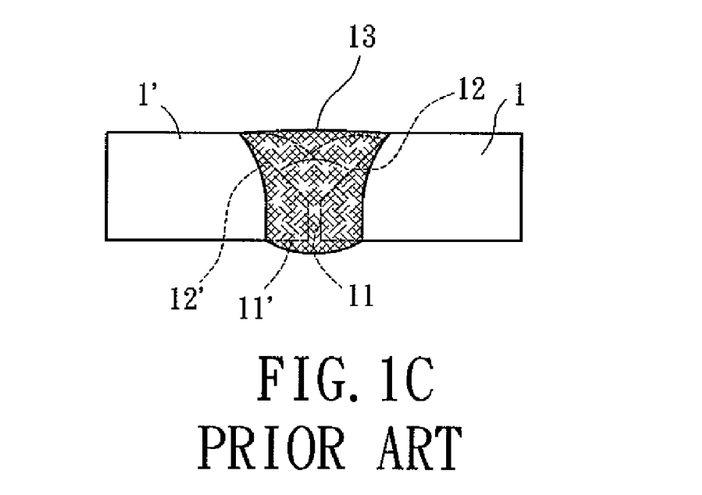
FIG. 1C is a side elevational view illustrating a weld bead between two workpieces in accordance with the prior art, after processing the TIG welding operation depicted in FIG. 1B.

In view of the potential problem, various approaches have been used to enhance the TIG welding characteristics. Turning now to FIGS. 1A, 1B and 1C, various views of pre-processing a workpiece for conventional TIG welding and welding two processed workpieces together are shown. For eliminating the problem of broad, shallow weld pool, a milling cutter 2 is used to cut a side wall 11 of a workpiece 1 so as to form an inclined surface 12 on the side wall 11. The inclined surface 12 of the workpiece 1 abuts against an inclined surface 12' of another workpiece 1' to define a V-groove therebetween for forming a butt joint. In the welding operation, a welding torch 3 and a welding rod 100 are used to execute the TIG welding process between the two workpieces 1, 1' to form welds 13. Although such an arrangement of the inclined surface 12 is successful in increasing depth of the welds 13, forming the inclined surface 12 sophisticates the manufacturing process and increases manufacturing cost and time.

Another conventional welding flux disclosed in U.S. Patent Publication No. 2005/0199317, entitled "Welding Flux for Use in Arc-Welding of Stainless Steels, Method of Welding Stainless Steel Members Using the Welding Flux," includes a base material of manganese peroxide $MnO_2$. Furthermore, one additive material of zinc oxide (ZnO), silicon dioxide ($SiO_2$), chromium oxide ($CrO_2$), titanium dioxide ($TiO_2$), molybdenum dioxide ($MoO_2$) and ferric oxide ($Fe_2O_3$) may also be added to the base material. The base material occupies more than 70 wt % of the total flux, while the additive materials occupy less than 30 wt % of the total flux.

Figure 2A:
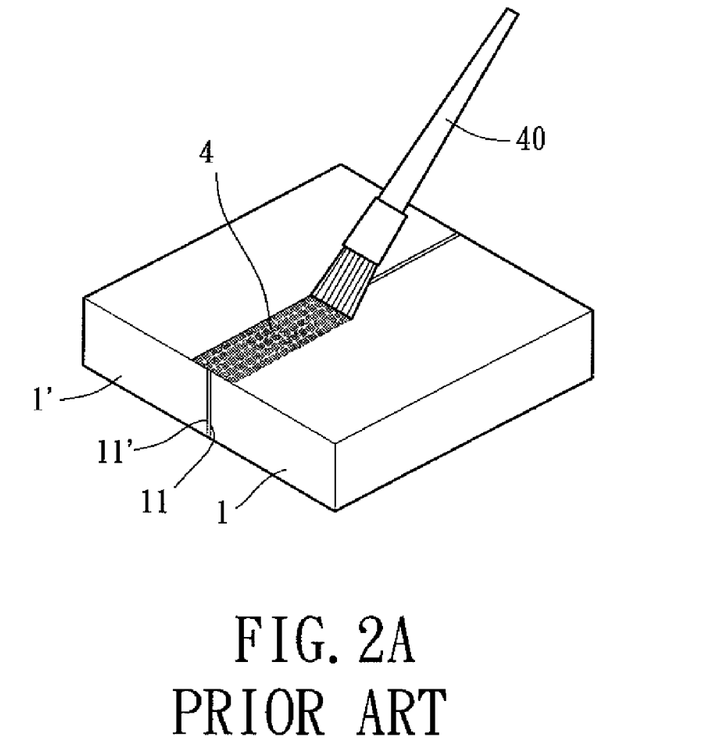
FIG. 2A is a perspective view illustrating a smearing operation of flux on a portion of a boundary line located between two workpieces in accordance with the prior art.
Figure 2B:
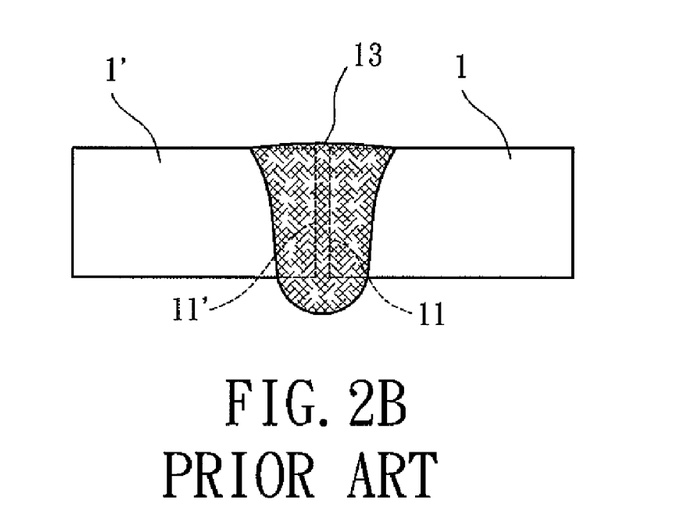
FIG. 2B is a side elevational view illustrating the TIG welding operation processed on the two workpieces in accordance with the prior art, after processing the smearing operation.

Turning now to FIGS. 2A and 2B, perspective and side elevational views of two workpieces welded by using flux disclosed in U.S. Patent Publication No. 2005/0199317 are shown. A welding flux 4 is made from a flux paste disclosed in U.S. Patent Publication No. 2005/0199317. A brush 40 is utilized to smear the flux 4 around an abutting portion between the two workpieces 1, 1' in preparing an arc welding process on the two workpieces 1, 1' such that the flux 4 is coated above a portion of a boundary line located between the two abutting side walls 11 of the two workpieces 1, 1'. After the welding process, the welds 13 are formed between the two abutting side walls 11, 11' of the two workpieces 1, 1'. Advantageously, spatter or slag rarely occurs around the welds 13 in the welding operation due to the use of the flux 4. A top surface of the welds 13 is nearly identical with top surfaces of other areas of the workpieces 1, 1'. It is apparent from FIG. 2B that the welds 13 formed between the two workpieces 1, 1' is successful in narrowing its width and is formed in full penetration welds.

Figure 3A:
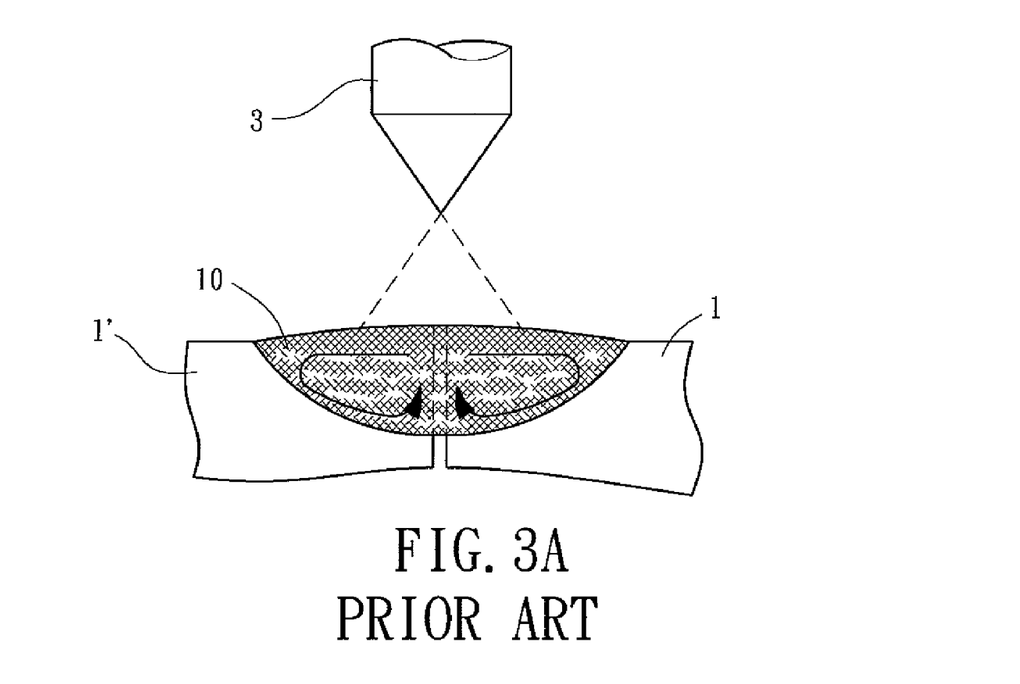
FIG. 3A is an enlarged, side elevational view illustrating liquid-state metal flows in a weld pool located between two workpieces in accordance with the prior art, during processing a TIG welding without active additive material.
Figure 3B:
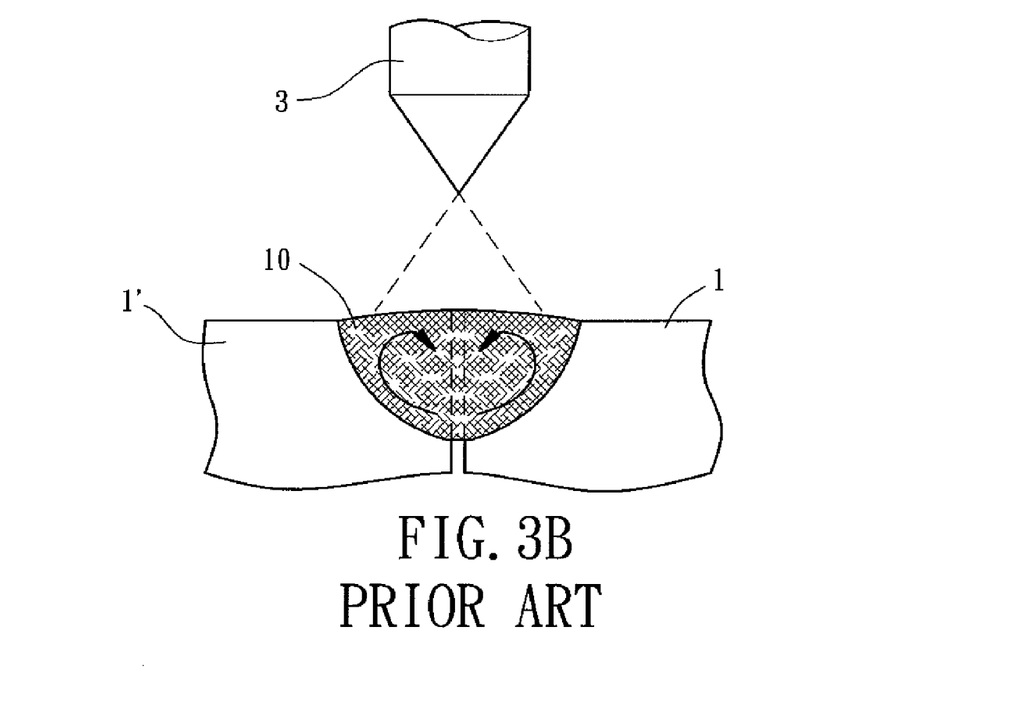
FIG. 3B is an enlarged, side elevational view illustrating liquid-state metal flows in a weld pool located between two workpieces in accordance with the prior art, during processing the TIG welding with active additive material.

Turning now to FIGS. 3A and 3B, enlarged, side elevational views of liquid-state metal flows in a weld pool located between two workpieces are shown. The primary approach for improving the welding quality is that the base material of $MoO_2$ and the additive material are added to the flux 4. Accordingly, the flux 4 applied to the workpieces 1, 1' can change a gradient of surface tension of the liquid-state metal on the surface of a weld pool 10 in the welding process and can influence directions of liquid-state metal flows in the weld pool 10. Changes of the gradient of surface tension of the liquid-state metal involve the temperature coefficient of the weld pool 10. Furthermore, the temperature coefficient of surface tension of the weld pool 10 depends upon whether an active element in the liquid-state metal is contained.

With continued reference to FIG. 3A, the flux 4 or the weld pool 10 does not contain an active element or a relatively inactive element(s). In this welding process, as the arc temperature supplied from the welding torch 3 increases, the surface tension of the weld pool 10 decreases. The decrease in the surface tension causes the liquid metal to generate outward liquid metal flows (i.e. outward surface tension flows) from a center portion of the weld pool 10. Disadvantageously, such outward liquid metal flows results result in an unwanted broad, shallow configuration of the welding bead.

With further reference to FIG. 3B, the flux 4 or the weld pool 10 contains relatively active elements. In this welding process, as the arc temperature supplied from the welding torch 3 increases, the surface tension of the weld pool 10 also increases. An increase of the surface tension causes the liquid metal to generate inward liquid metal flows (i.e. inward surface tension flows) from peripheral portions to a center portion of the weld pool 10. Advantageously, such inward liquid metal flows result in a preferred narrow and deep configuration of the welds.

It is apparent from FIG. 3B that the additives of active elements added to the mixture of the flux 4 are successful in forming a preferred narrow and deep configuration of the welds. However, the conventional flux 4 contains a great amount of the base material of $MoO_2$ which is an inactive material for the arc welding. Furthermore, there is a need of smearing the flux 4 on side walls 11, 11' of the workpieces 1, 1' such that an additional smearing step may sophisticate the entire arc welding process. In addition, an additional pre-fabricating procedure for the flux 4 may further sophisticate the entire arc welding process. Accordingly, there is a need of modifying the flux 4 so as to improve the welding quality of stainless steels.

As is described in greater detail below, the present invention provides an activating flux for welding stainless steels. The activating flux includes active additive materials of $TiO_2$, $Cr_2O_3$, $SiO_2$, $MoS_2$ and $MoO_3$ which can increase a deep degree of fill penetration in stainless steel welds and enhance a degree of weldability of the arc welding operation. In addition, the active additive materials can enhance a degree of uniformity, mechanical strength, and impact toughness of the weldment. Accordingly, the flux of the present invention can improve the welding quality of stainless steels in such a way as to mitigate and overcome the above problem. Advantageously, the activating flux is successful in simplifying the arc welding process and increasing the efficiency of arc welding.

SUMMARY OF THE INVENTION

The primary objective of this invention is to provide an activating flux for welding stainless steel. The activating flux contains molybdenum trioxide ($MoO_3$) which can achieve a deep degree of full penetration welds.

The secondary objective of this invention is to provide the activating flux for welding stainless steel containing silicon dioxide ($SiO_2$) which can also achieve a deep degree of full penetration welds and enhance a degree of the material weldability.

Another objective of this invention is to provide the activating flux for welding stainless steel containing titanium dioxide ($TiO_2$) and chromium oxide ($Cr_2O_3$) which can achieve a higher degree of mechanical strength and impact toughness of the weldment.

Another objective of this invention is to provide the activating flux for welding stainless steel containing molybdenum disulphide ($MoS_2$) which can achieve a higher degree of uniformity of welds.

Another objective of this invention is to provide the activating flux for welding stainless steel provided in a welding rod or wire made from a welding material such that the welding rod or wire includes a welding flux layer.

The activating flux in accordance with an aspect of the present invention includes: from 25 to 40 weight percent of titanium dioxide ($TiO_2$); from 25 to 30 weight percent of chromium oxide ($Cr_2O_3$); from 10 to 30 weight percent of silicon dioxide ($SiO_2$); from 10 to 15 weight percent of molybdenum disulphide ($MoS_2$); and from 5 to 15 weight percent of molybdenum trioxide ($MoO_3$), which are active additive materials.

In a separate aspect of the present invention, the molybdenum element is selected from molybdenum trioxide ($MoO_3$).

In a further separate aspect of the present invention, an activating flux layer is provided on or in a welding rod or wire.

In a yet further separate aspect of the present invention, the activating flux layer is provided on an outer surface of a welding material core portion of the welding rod or wire.

In a yet further separate aspect of the present invention, the activating flux layer is formed as a core portion provided in a welding material outer layer of the welding rod or wire.

In a yet further separate aspect of the present invention, the welding material outer layer has at least one extension layer extended into the activating flux layer formed as the core portion of the welding rod or wire.

Further scope of the applicability of the present invention will become apparent from the detailed description given hereinafter. However, it should be understood that the detailed description and specific examples, while indicating preferred embodiments of the invention, are given by way of illustration only, since various modifications will become apparent to those skilled in the art from this detailed description.

BRIEF DESCRIPTION OF THE DRAWINGS

The present invention will become more fully understood from the detailed description given hereinbelow and the accompanying drawings, which are given by way of illustration only, and, thus, are not limitative of the present invention, and wherein.

DETAILED DESCRIPTION OF THE INVENTION

An activating flux for welding stainless steel in accordance with the preferred embodiment of the present invention includes titanium dioxide ($TiO_2$), chromium oxide ($Cr_2O_3$), silicon dioxide ($SiO_2$), molybdenum disulphide ($MoS_2$) and molybdenum trioxide ($MoO_3$), which are active additive materials. In an arc welding operation, the active additive materials can increase a deep degree of full penetration weld on the stainless steel and enhance a degree of material weldability. In addition, the active additive materials can enhance a degree of uniformity, mechanical strength, and impact toughness of the weldment. Preferably, the activating flux includes 25 wt % to 40 wt % of $TiO_2$, 25 wt % to 30 wt % of $Cr_2O_3$, 10 wt % to 30 wt % of $SiO_2$, 10 wt % to 15 wt % of $MoS_2$, and 5 wt % to 15 wt % of $MoO_3$.

The activating flux in accordance with the present invention contains a desired amount of molybdenum trioxide. Preferably, the molybdenum element is selected from molybdenum trioxide ($MoO_3$), which can increase a deep degree of full penetration in the stainless steel welds such that the ratio of depth to width of welds is thus increased to thereby reduce a heat-effected zone of the stainless steel during the arc welding operation. More preferably, the activating flux contains a desired amount of silicon dioxide which can also achieve a deep degree of fall penetration welds and enhance a degree of material weldability. More preferably, the activating flux contains a desired amount of titanium dioxide and chromium oxide which can achieve a higher degree of mechanical strength and impact toughness of the weldment. More preferably, the activating flux contains a desired amount of molybdenum disulphide which can reduce the amount of spatters or slag occurring in the welding operation such that a high degree of uniformity of the welds is achieved. Accordingly, the additive material of molybdenum disulphide can improve the appearance of the welds.

The activating flux in accordance with the present invention is suitable for welding various stainless steel workpieces in arc welding. The stainless steel workpieces may be selected from stainless steel Japanese Industrial Standards (JIS), American Iron & Steel Institute (AISI), Deutsches Institut für Normung (DIN), British Standards (BS) or MIL standard. For example, the stainless steel workpieces may be selected from Austenitic stainless steel of SUS 304 or SUS 316. Preferably, the arc welding may be Tungsten Inert Gas (TIG) Welding, Metal Inert Gas (MIG) Welding, Carbon Arc Welding (CAW), Submerged Arc Welding (SAW), Flux Cored Arc Welding (FCAW), etc. in practicing the present invention.

By way of example, the activating flux in accordance with the present invention is implemented to be welded SUS 304 stainless steel by utilizing a TIG welding operation, as is described in greater detail below. The examples of the activating flux in accordance with the present invention illustrated herein are shown for exemplification and not by way of limitation. It will be understood that the active additive materials of the activating flux of the present invention can be changed without departing from the scope of the invention.

$MoS_2$, and 10 wt % of $MoO_3$. Disadvantageously, for example, if the amount of molybdenum trioxide of the activating flux is less than 5 wt % or greater than 15 wt %, the ratio of depth to width of welds is reduced, or a degree of modification of the other active additive materials is affected. If, for example, the amount of silicon oxide of the activating flux is less than 10 wt % or greater than 30 wt %, a degree of weldability of the activating flux is deteriorated, or a degree of modification of the other active additive materials is affected. If, for example, the amount of titanium dioxide of the activating flux is less than 25 wt % or greater than 40 wt %, a degree of mechanical strength and impact toughness of the weldment is reduced, or a degree of modification of the other active additive materials is affected. Also, if, for example, the amount of chromium oxide of the activating flux is less than 25 wt % or greater than 30 wt %, a degree of mechanical strength and impact toughness of the weldment is reduced, or a degree of modification of the other active additive materials is affected. In addition, if, for example, the amount of molybdenum disulphide of the activating flux is less than 10 wt % or greater than 15 wt %, a greater amount of spatters or slag is accumulated on the welds, and the appearance is thus poor, or a degree of modification of the other active additive materials is affected.

In a preferred embodiment, the total amount of titanium dioxide, chromium oxide and silicon oxide of the activating flux is in the range of 80 wt % to 90 wt %. In another preferred embodiment, the ratio of titanium dioxide to chromium oxide ($TiO_2/Cr_2O_3$) is preferably in the range of 1.0:1.0 to 1.4:1.0.

Turning now to FIGS. 4A through 4D, several fragmental, perspective views of a welding rod in accordance with a first through fourth embodiments of the present invention are illustrated. Turning to FIG. 5, a perspective view of a TIG welding operation processed on a butt joint of two workpieces using the welding rod in accordance with the first through fourth embodiments of the present invention is illustrated. In FIGS. 4A through 4D, an end section of a welding rod or wire 100 is shown. The welding rod 100 includes a welding material layer 101 and an activating flux layer 102. Preferably, the activating flux layer 102 is provided on or in the welding rod 100. It will be understood that the welding rod or wire is intended for illustration, but not limited to the present invention.

Figure 4A:
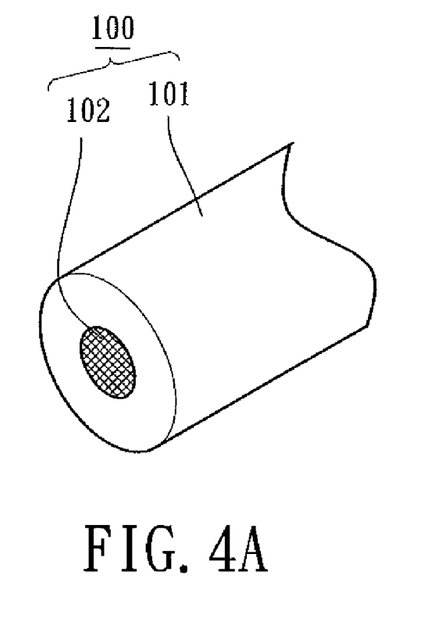
FIG. 4A is a fragmental, perspective view illustrating a welding rod having an activating flux in accordance with a first embodiment of the present invention.
Figure 5:
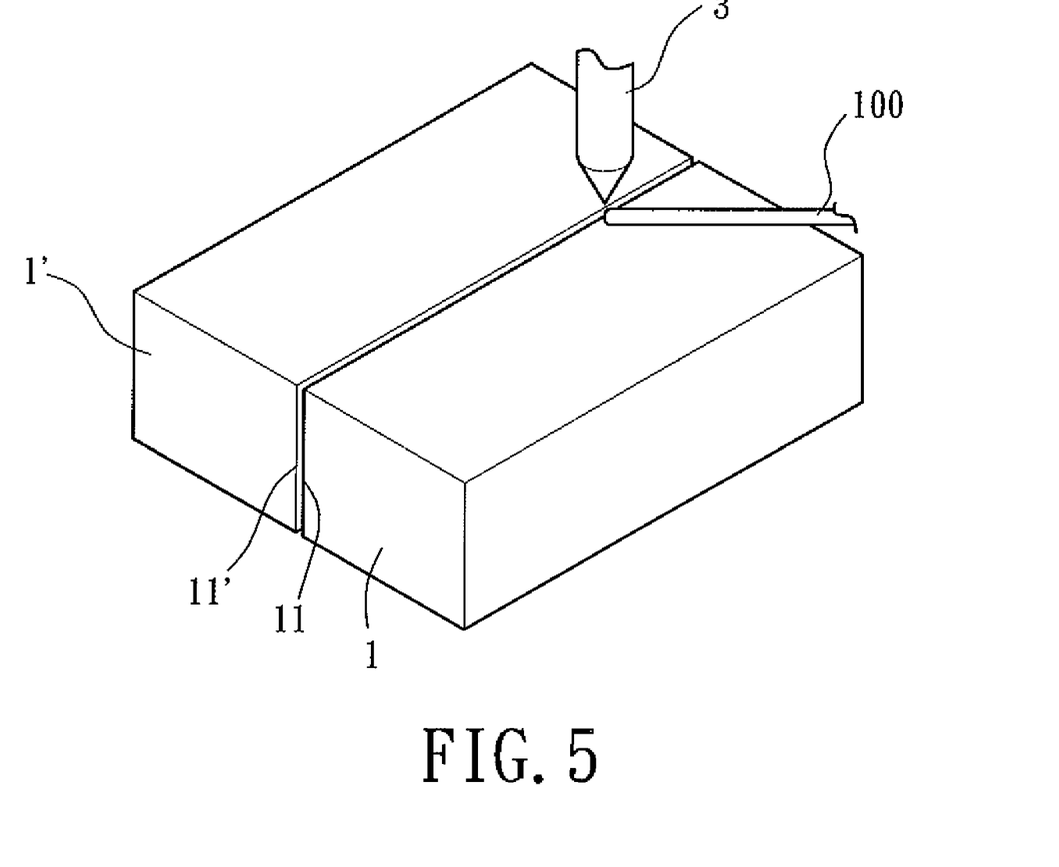
FIG. 5 is a perspective view illustrating a TIG welding operation processed on a butt joint of two workpieces using the welding rod in accordance with the first through fourth embodiments of the present invention.

With reference to FIG. 4A, the activating flux layer 102 in accordance with the first embodiment of the present invention

TABLE 1

Active Additive Materials of Flux of the Present Invention and its Properties

| Example | $TiO_2$ | $Cr_2O_3$ | $SiO_2$ | $MoS_2$ | $MoO_3$ | Full penetration | Mechanical strength | Impact toughness | Welds appearance | Weldability |
|---------|---------|-----------|---------|---------|---------|------------------|---------------------|------------------|------------------|-------------|
| I | 25 wt % | 25 wt % | 30 wt % | 15 wt % | 5 wt % | E | E | E | E | E |
| II | 30 wt % | 30 wt % | 15 wt % | 10 wt % | 15 wt % | G | G | G | G | E |
| III | 40 wt % | 30 wt % | 10 wt % | 10 wt % | 10 wt % | E | E | E | G | G |

E: excellent;
G: good.

Figure 4B:
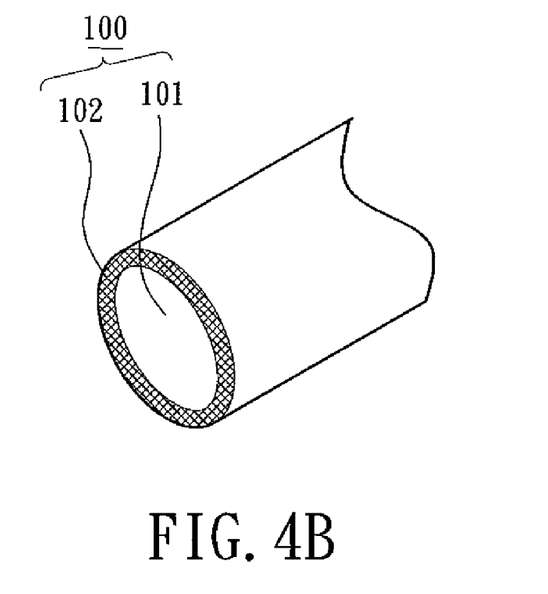
FIG. 4B is a fragmental, perspective view illustrating a welding rod having an activating flux in accordance with a second embodiment of the present invention.
Figure 4C:
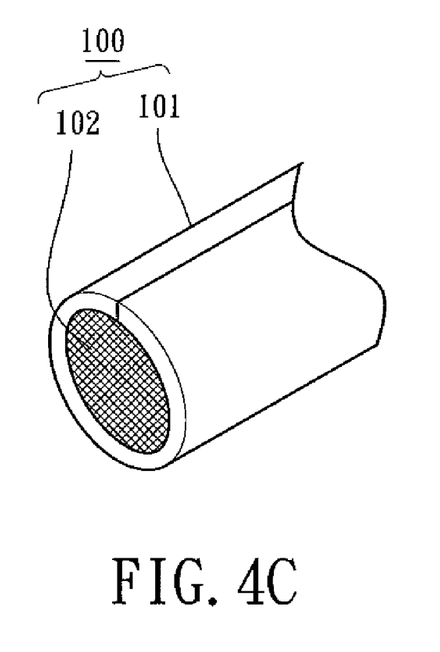
FIG. 4C is a fragmental, perspective view illustrating a welding rod having an activating flux in accordance with a third embodiment of the present invention.
Figure 4D:
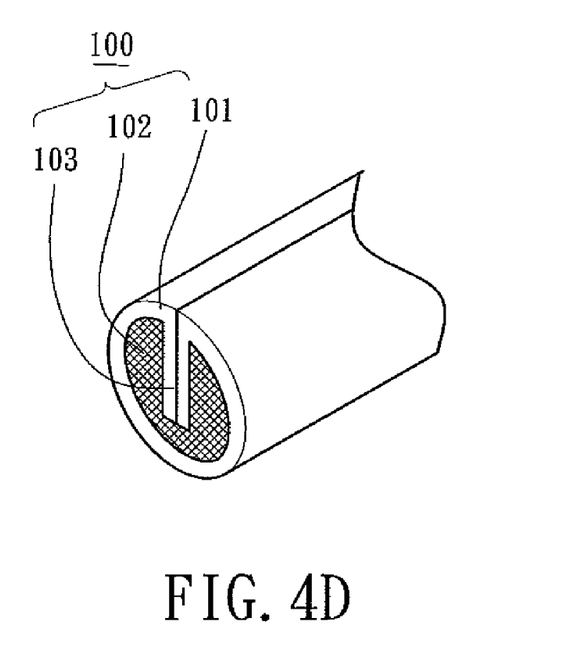
FIG. 4D is a fragmental, perspective view illustrating a welding rod having an activating flux in accordance with a fourth embodiment of the present invention.

Referring to TABLE 1, in the first example, the activating flux includes 25 wt % of $TiO_2$, 25 wt % of $Cr_2O_3$, 30 wt % of $SiO_2$, 15 wt % of $MoS_2$, and 5 wt % of MoO. In the second example, the activating flux includes 30 wt % of $TiO_2$, 30 wt % of $Cr_2O_3$, 15 wt % of $SiO_2$, 10 wt % of $MoS_2$, and 15 wt % of MoO. In the third example, the activating flux includes 40 wt % of $TiO_2$, 30 wt % of $Cr_2O_3$, 10 wt % of $SiO_2$, 10 wt % of is formed as a core portion provided in a welding material layer (i.e. welding material outer layer) 101 of the welding rod 100. With further reference to FIG. 4B, the activating flux layer 102 in accordance with the second embodiment of the present invention is provided on an outer surface of a welding material layer (i.e. welding material core portion) 101 of the welding rod 100. With further reference to FIG. 4C, the welding material layer (i.e. welding material outer layer) 101 of the welding rod 100 in accordance with the third embodiment of the present invention is rolled to combine the activating flux layer 102 formed as the core portion of the welding rod 100. With further reference to FIG. 4D, the rolled welding material layer (i.e. welding material outer layer) 101 of the welding rod 100 in accordance with the fourth embodiment of the present invention has a pair of extension layers 103 extended into and embedded in the activating flux layer 102 formed as the core portion of the welding rod 100.

Referring again to FIGS. 4A through 4D and 5, the ratio of the welding material to the flux of the present invention depends upon welding various types of stainless steels. The welding material provided in the welding material layer 101 is selected from conventional welding materials of stainless steels which are incorporated herein by reference for purposes including, but not limited to, indicating the background of the present invention and illustrating the state of the art. In a TIG welding operation, a welding torch (e.g. tungsten electrode) 3 and a welding rod 100 are used to weld two abutting side walls 11, 11' of two workpieces 1, 1'. The welding torch 3 can be designed to supply a protective gas (i.e. inert gas) selected from argon, helium or a mixture thereof. The welding material layer 101 and the activating flux layer 102 are molten in an arc of the welding torch 3. The molten activating flux can enhance a degree of weldability of the molten welding material.

Referring back to FIGS. 2B and 3B, the molten activating flux of the first through fourth embodiments of the present invention contains the active additive materials of titanium dioxide ($TiO_2$), chromium oxide ($Cr_2O_3$), silicon dioxide ($SiO_2$), molybdenum disulphide ($MoS_2$) and molybdenum trioxide ($MoO_3$), which can effectively enhance changes of the gradient of surface tension of the liquid-state metal on the surface of the weld pool 10. The active additive materials contained in the molten activating flux can also influence directions of the liquid-state metal flows in the weld pool 10. As the arc temperature supplied from the welding torch 3 increases, the surface tension of the weld pool 10 also increases. Accordingly, there are inward liquid metal flows (i.e. inward surface tension flows) from the peripheral portions to the center portion of the weld pool 10 due to the active additive materials of influence. In this circumstance, the liquid-state metal at the center portion of the weld pool 10 is concentrated, and current densities located in anode spots of the weld pool 10 are thus increased such that it results in a preferred narrow, deep configuration of the welds 13, as best shown in FIG. 2B. Consequently, the ratio of depth to width of the welds 13 is thus increased to thereby reduce a heat-effected zone between the two stainless steel workpieces 1, 1' during the TIG welding operation.

Referring back to TABLE 1, the amount of the active additive materials contained in the activating flux of Examples I through III can further be adjusted and varied depending on the operational conditions so long as a high degree of fill penetration welds, mechanical strength, impact toughness and weldability of the weldment 13 is achieved. In addition to this, a small amount of spatters or slag occurs in the welding operation so that the welds 13 have a top surface approximately identical with the original top surfaces of the workpieces 1, 1' such that a high degree of uniformity of the welds 13 is achieved. For example, the full penetration welds 13 are successfully carried out on a thickness of 6 mm of the workpieces 1, 1' which is made from SUS 304 stainless steel. Advantageously, the welding operation of the present invention can omit performing a number of steps for the workpieces 1, 1' in preparing the welding. In Examples I to III, the activating flux (i.e. activating flux layer 102) of the present invention can be incorporated into the welding material (i.e. welding material layer 101) to form a one-piece member of the welding rod 100, as best shown in FIGS. 4A through 4B, which can supply an appropriate amount of the activating flux in the welding operation to avoid being wasteful of the activating flux. Also, using the welding rod 100 can easily process the welding operation.

Referring back to FIG. 1A, the conventional TIG welding without flux requires performing a number of steps for forming the inclined surfaces 12, 12' on the side walls 11, 11' of the workpieces 1, 1' in preparing the welding operation. Disadvantageously, it results in a complicated process of the TIG welding and a waste of processing time. Referring further back to FIG. 2A, the conventional flux for use in TIG welding contains a great amount of the inactive base material of $MoO_2$ such that there is a need for repeatedly smearing the flux around the side walls 11, 11' of the workpieces 1, 1'. Disadvantageously, it also results in a complicated process of the TIG welding and a waste of processing time. Conversely, referring back to FIGS. 4A through 4D, the activating flux of the present invention contains an appropriate amount of active additive materials (i.e. activating flux layer 102) of titanium dioxide ($TiO_2$), chromium oxide ($Cr_2O_3$), silicon dioxide ($SiO_2$), molybdenum disulphide ($MoS_2$) and molybdenum trioxide ($MoO_3$) which can enhance full penetration welds and material weldability of the welding operation and can achieve a higher degree of uniformity, mechanical strength, and impact toughness of the weldment.

Although the invention has been described in detail with reference to its presently preferred embodiments, it will be understood by one of ordinary skill in the art that various modifications can be made without departing from the spirit and the scope of the invention, as set forth in the appended claims.

What is claimed is:

1. An activating flux for welding stainless steel, comprising:
   titanium dioxide of weight percent from 25 to 40;
   chromium oxide of weight percent from 25 to 30;
   silicon dioxide of weight percent from 10 to 30;
   molybdenum disulphide of weight percent from 10 to 15; and
   molybdenum trioxide of weight percent from 5 to 15;
   wherein said titanium dioxide, chromium oxide, silicon dioxide, molybdenum disulphide, and molybdenum trioxide are active additive materials.

2. The activating flux for welding stainless steel as defined in claim 1, wherein a ratio of said titanium dioxide to said chromium oxide is in the range of 1.0:1.0 to 1.4:1.0.

3. The activating flux for welding stainless steel as defined in claim 1, further comprising a welding material to form a welding material layer while the activating flux forming an activating flux layer, wherein the activating flux layer is provided in the welding material layer, and is formed as a core portion to form a welding rod or wire.

4. The activating flux for welding stainless steel as defined in claim 3, wherein said welding material layer has at least one extension layer extended into the activating flux layer.

5. The activating flux for welding stainless steel as defined in claim 1, further comprising a welding material to form a welding material layer while the activating flux forming an activating flux layer, wherein the activating flux layer is provided on an outer surface of the welding material layer, and is formed as an outer layer to form a welding rod or wire.

6. A welding rod having an activating flux, comprising:
an activating flux including titanium dioxide, chromium oxide, silicon dioxide, molybdenum disulphide, and molybdenum trioxide, wherein said titanium dioxide, chromium oxide, silicon dioxide, molybdenum disulphide, and molybdenum trioxide are active additive materials and said titanium dioxide is from 25 to 40 weight percent, said chromium oxide is from 25 to 30 weight percent, said silicon dioxide is from 10 to 30 weight percent, said molybdenum disulphide is from 10 to 15 weight percent and said molybdenum trioxide is from 5 to 15 weight percent; and
a welding material incorporated with the activating flux to form the welding rod.

7. The welding rod having the activating flux as defined in claim 6, wherein a ratio of said titanium dioxide to said chromium oxide is in the range of 1.0:1.0 to 1.4:1.0.

8. The welding rod having the activating flux as defined in claim 6, wherein the activating flux is formed as an activating flux layer while the welding material is formed as a welding material layer; and wherein the activating flux layer is provided in the welding material layer, and is formed as a core portion to form a welding rod or wire.

9. The welding rod having the activating flux as defined in claim 8, wherein said welding material layer has at least one extension layer extended into the activating flux layer.

10. The welding rod having the activating flux as defined in claim 6, wherein the activating flux is formed as an activating flux layer while the welding material is formed as a welding material layer; and wherein the activating flux layer is provided on an outer surface of the welding material layer, and is formed as an outer layer to form a welding rod or wire.

* * * * *